US012677937B2

(12) United States Patent
Baker

(10) Patent No.: US 12,677,937 B2
(45) Date of Patent: Jul. 14, 2026

(54) ELECTRIC TOOTHBRUSH SYSTEM

(71) Applicant: Gregory Robert Baker, Hazard, KY (US)

(72) Inventor: Gregory Robert Baker, Hazard, KY (US)

( * ) Notice: Subject to any disclaimer, the term of this patent is extended or adjusted under 35 U.S.C. 154(b) by 398 days.

(21) Appl. No.: 18/523,996

(22) Filed: Nov. 30, 2023

(65) Prior Publication Data

US 2024/0090657 A1 Mar. 21, 2024

(51) Int. Cl.
| *A46B 15/00* | (2006.01) |
| *A46B 5/00* | (2006.01) |
| *A46B 9/04* | (2006.01) |
| *A46B 11/06* | (2006.01) |
| *A46B 13/02* | (2006.01) |
| *A46B 13/04* | (2006.01) |
| *A61C 17/02* | (2006.01) |
| *A61C 17/22* | (2006.01) |
| *A61C 17/34* | (2006.01) |

(52) U.S. Cl.
CPC ........ *A46B 15/0053* (2013.01); *A46B 5/0095* (2013.01); *A46B 9/04* (2013.01); *A46B 11/063* (2013.01); *A46B 13/023* (2013.01); *A46B 13/04* (2013.01); *A46B 15/0034* (2013.01); *A46B 15/0095* (2013.01); *A61C 17/0205* (2013.01); *A61C 17/0208* (2013.01); *A61C 17/221* (2013.01); *A61C 17/3481* (2013.01)

(58) Field of Classification Search
CPC ........................ A46B 15/0053; A46B 15/0048
See application file for complete search history.

(56) References Cited

U.S. PATENT DOCUMENTS

| 8,272,091 | B2 * | 9/2012 | Hwang | .................. | A61C 17/32 |
| | | | | | 15/22.1 |
| 10,080,632 | B2 * | 9/2018 | Lee | .......................... | A61B 1/06 |
| 11,399,925 | B2 * | 8/2022 | Sokol | ................. | A61C 17/0202 |
| 12,295,803 | B2 * | 5/2025 | Li | ........................ | A61C 17/024 |
| 2010/0106336 | A1 * | 4/2010 | Hwang | .............. | A46B 15/0006 |
| | | | | | 15/22.1 |
| 2017/0112603 | A1 * | 4/2017 | Lee | ........................ | A61B 1/247 |
| 2020/0205952 | A1 * | 7/2020 | Sokol | .................... | A61C 17/02 |
| 2024/0041579 | A1 * | 2/2024 | Li | ........................ | A61C 17/225 |

OTHER PUBLICATIONS

KR 101255575 B1 + machine translation (Year: 2013).*

* cited by examiner

*Primary Examiner* — Juan G Flores
(74) *Attorney, Agent, or Firm* — Trevor T. Graves; Stites & Harbison PLLC

(57) ABSTRACT

Presented is an electric toothbrush system capable of being operated in a rinsing mode to rinse the mouth with clean water, a vacuuming mode for sucking out oral gunk left in the mouth after brushing is done besides used for cleaning teeth and gums. The electric toothbrush system is configured to illuminate the interior of the mouth of the user, and is provided with the capability to decontaminate the water used for rinsing the mouth.

20 Claims, 9 Drawing Sheets

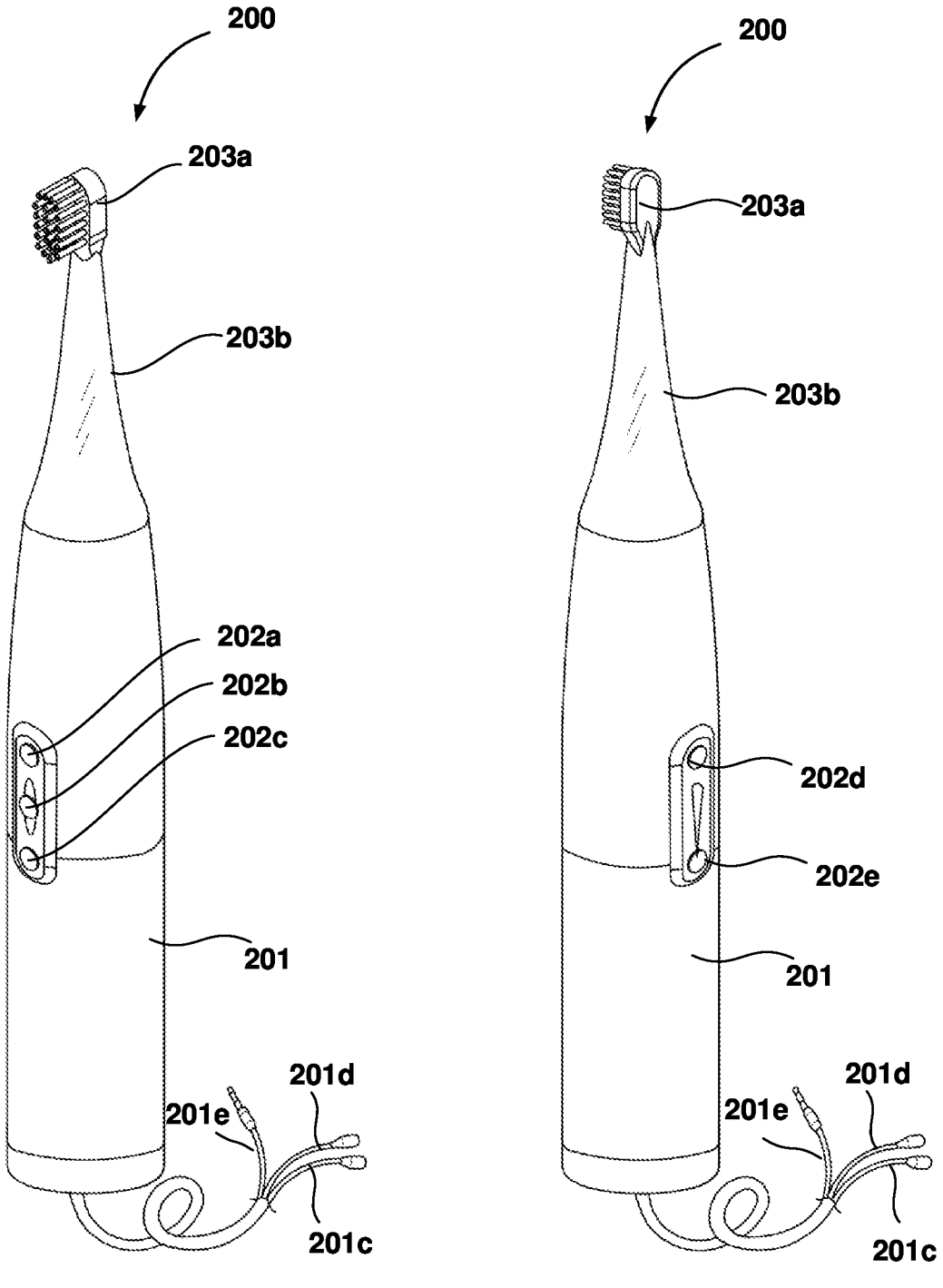
FIG.3          FIG.4

ELECTRIC TOOTHBRUSH SYSTEM

TECHNICAL FIELD

The present disclosure relates to an oral cleaning system, and more particularly to an electric toothbrush system capable of selectively operable in at least a rinsing mode to rinse the mouth with clean water and a vacuuming mode for sucking oral gunk left in the mouth after brushing is done besides generating bristle motion for cleaning the teeth and gums.

BACKGROUND

The benefits of brushing one's teeth using motorized toothbrushes are well known, and motorized movement in toothbrushes has been the subject of much recent innovation and design activity. Also, the commercial market has seen the introduction, over the last several years, of many different types of motorized toothbrushes.

Electric toothbrushes are designed to make fast, automatic bristle motion either rotation oscillation or back-and-forth oscillation, to help clean teeth. Electric toothbrushes not only make the process of brushing teeth much easier but are also effective in removing buildup. Electric toothbrushes offer added benefits for kids, aged persons, and patients with disabilities often in hospitals. Electric toothbrushes are available in a variety of configurations. The most common configuration is a handle housing a motor and a single drive element. A brushing member having a single brush is removably secured to the handle and is operatively driven by the drive element.

However, an examination of the available technology in electric toothbrushes shows a tendency toward increasingly complex, expensive, and non-commercially feasible designs in particular with respect to their uses when it comes to maintaining oral health in patients with neuromuscular disability and reducing the caregivers' oral care burden. The traditional electric toothbrushes have limitations with respect to not being able to allow users to rinse the mouth post-brushing and involving the use of bathroom sinks/bowls for spitting out or gargling out the oral gunk after brushing is done.

In the light of the aforementioned background, the inventor herein is proposing a novel electric toothbrush system that not only helps in brushing the teeth like any other traditional electric toothbrushes but also at the same time have the capability to allow patients with a disability to rinse their mouth with clean water and vacuum out the oral gunk left over after the brushing is done, reducing the caregivers' oral care burden. The proposed electric toothbrush system additionally offers many other advantageous features as summarized and described below.

BRIEF SUMMARY

Accordingly, it is an object of the present invention to provide an electric toothbrush system capable of selectively operable in at least a rinsing mode to rinse the mouth with clean water, and a vacuuming mode for sucking oral gunk left in the mouth after brushing is done apart from generating bristle motion for cleaning the teeth.

Another object of the present invention is to provide an electric toothbrush system that makes use of a decontaminator unit for decontaminating water by killing viruses, bacteria, and fungi present in the water before being used to rinse the mouth in the rinsing mode. The decontaminator unit may be an ultraviolet-c light source (UV-C light source).

Another object of the present invention is to provide an electric toothbrush system featuring one or more LED lights to illuminate the interior region of the mouth.

Another object of the present invention is to provide an electric toothbrush system that's portable, easy to use, and clean.

Another object of the present invention is to provide an electric toothbrush system with an electric toothbrush capable of producing vibrations up to 40000 vibrations per minute and operable in different modes of operations.

Embodiments of the present invention present an electric toothbrush system. The electric toothbrush system includes a base station and a toothbrush. The base station includes a first portion with a toothbrush mounting provision, and a second portion comprising a first tank with a first diaphragm pump operationally connected thereto for dispensing water from the first tank into the mouth of a user, and a second tank with a second diaphragm pump operationally connected thereto for vacuuming oral fluid after brushing and collecting into the second tank. The base station is powered by the mains (i.e., 120V, 60 Hz AC) or using one or more batteries.

According to the embodiment, the first portion of the base station further comprises at least a first control circuitry comprising one or more microprocessors; a power ON/OFF button; a plurality of LED indicators indicative of one or more operations of the toothbrush, and if the toothbrush is being operated with mains supply or batteries; and a decontaminator unit configured to decontaminate the water stored in the first tank using an activation button. The operations of the toothbrush comprises at least dispensing of water into the mouth, and vacuuming out the oral fluids after brushing. The one or more microprocessors is configured to control the speed of at least one motor and lighting the plurality of LED indicators for output indications. The decontaminator unit is an ultraviolet-c light source (UV-C light source) capable of killing viruses, bacteria, and fungi present in the water in the first tank by irradiating them with UV-C light.

According to the embodiment, the toothbrush of the electric toothbrush system comprises a toothbrush handle having a proximal end and a distal end. The toothbrush handle includes a first fluid conduit, and a second fluid conduit extending partially from the proximal end towards the distal end along the length of the toothbrush handle. The first fluid conduit is coupled to the first tank using a first hose, and the second fluid conduit is coupled to the second tank using a second hose. Each of the first fluid conduit and the second fluid conduit of the toothbrush handle are integrally formed on the walls of the toothbrush handle.

According to the embodiment, the toothbrush further includes one or more buttons for controlling one or more functionalities of the toothbrush. The one or more buttons for controlling one or more functionalities of the toothbrush include at least: a button to turn the toothbrush ON/OFF; a button to initiate the dispensing of water from the first tank into the mouth of the user; a button to initiate vacuuming of the oral fluid from the mouth and collection into the second tank; and a mode control button to control one or more operating modes of the toothbrush comprising a clean mode, a sensitive mode, a whitening mode, and a massage mode. The one or more operating modes of the toothbrush identify different vibrational speeds of the at least one motor.

According to the embodiment, the toothbrush further includes a head portion comprising a head and a neck. The neck is configured to removably couple the head portion to the proximal end of the toothbrush handle. The head portion comprises a pair of fluid channels each of which is axially aligned to the first fluid conduit, and the second fluid conduit of the toothbrush handle when the head portion is coupled to the toothbrush handle. The neck of the head portion or the toothbrush handle comprises conventional LEDs to illuminate the interior region of the mouth. The head incorporates bristles for cleaning the teeth. The head comprises a guiding LED light surrounding the bristles to illuminate the interior region of the mouth. The neck of the head portion is transparent.

The head comprises at least one water dispensing port in fluid communication with the fluid channel of the head portion and the first fluid conduit of the toothbrush handle. The head comprises at least one oral fluid vacuuming port in fluid communication with the fluid channel of the head portion and the second fluid conduit of the toothbrush handle.

According to the embodiment, the toothbrush, particularly the toothbrush handle includes a motion-inducing assembly comprising at least one motor mounted on a bracket. The at least one motor is capable of producing vibrations up to 40000 vibrations per minute.

According to the embodiment, the toothbrush further comprises a second control circuitry comprising one or more microprocessors configured to control at least a guiding LED light surrounding the bristles of the head, and the conventional LEDs present in the neck of the head portion or the toothbrush handle.

Various advantages and features of the present invention are described herein with specificity so as to make the present invention understandable to one of ordinary skill in the art, both with respect to how to practice the present invention and how to make the present invention.

BRIEF DESCRIPTION OF THE DRAWINGS

The above set forth and other features of the present invention are made more apparent in the ensuing description of the preferred embodiments when read in conjunction with the attached drawings, wherein:

FIGS. 3 and 4 shows a front perspective view and a rear perspective view of an electric toothbrush, according to an exemplary embodiment of the present invention;

Identical reference numerals in the figures are intended to indicate like parts, although not every feature in every figure may be called out with a reference numeral.

DETAILED DESCRIPTION

Certain terminology is used in the following description for reference only and is not limiting. Unless specifically set forth herein, the terms "a," "an," and "the" are not limited to one element, but instead should be read as meaning "at least one." The terminology includes the words noted above, derivatives thereof, and words of similar import. Before describing the present invention in detail, it should be observed that the present invention utilizes a combination of components, which constitutes an electric toothbrush system and associated components thereof. Accordingly, the components have been represented, showing only specific details that are pertinent for an understanding of the present invention so as not to obscure the disclosure with details that may be readily apparent to those with ordinary skill in the art having the benefit of the description herein. As required, the detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The words "comprising", "having", "containing", and "including", and other forms thereof, are intended to be equivalent in meaning and be open-ended in that an item or items following any one of these words is not meant to be an exhaustive listing of such item or items or meant to be limited to only the listed item or items.

Referring to FIGS. 1-6 in conjunction with FIGS. 7-8, 9A-9C, 10-11, and 12, the electric toothbrush system 100 of the present invention can be used for personal hygiene such as brushing one's teeth and gums, rinsing one's mouth and vacuuming one's oral gunk from the mouth after the brushing is done just by press of buttons. The electric toothbrush system 100 includes a base station 102, and a toothbrush 200.

Figure 1:
FIGS. 1 and 2 shows an electric toothbrush system, according to an exemplary embodiment of the present invention.
Figure 2:
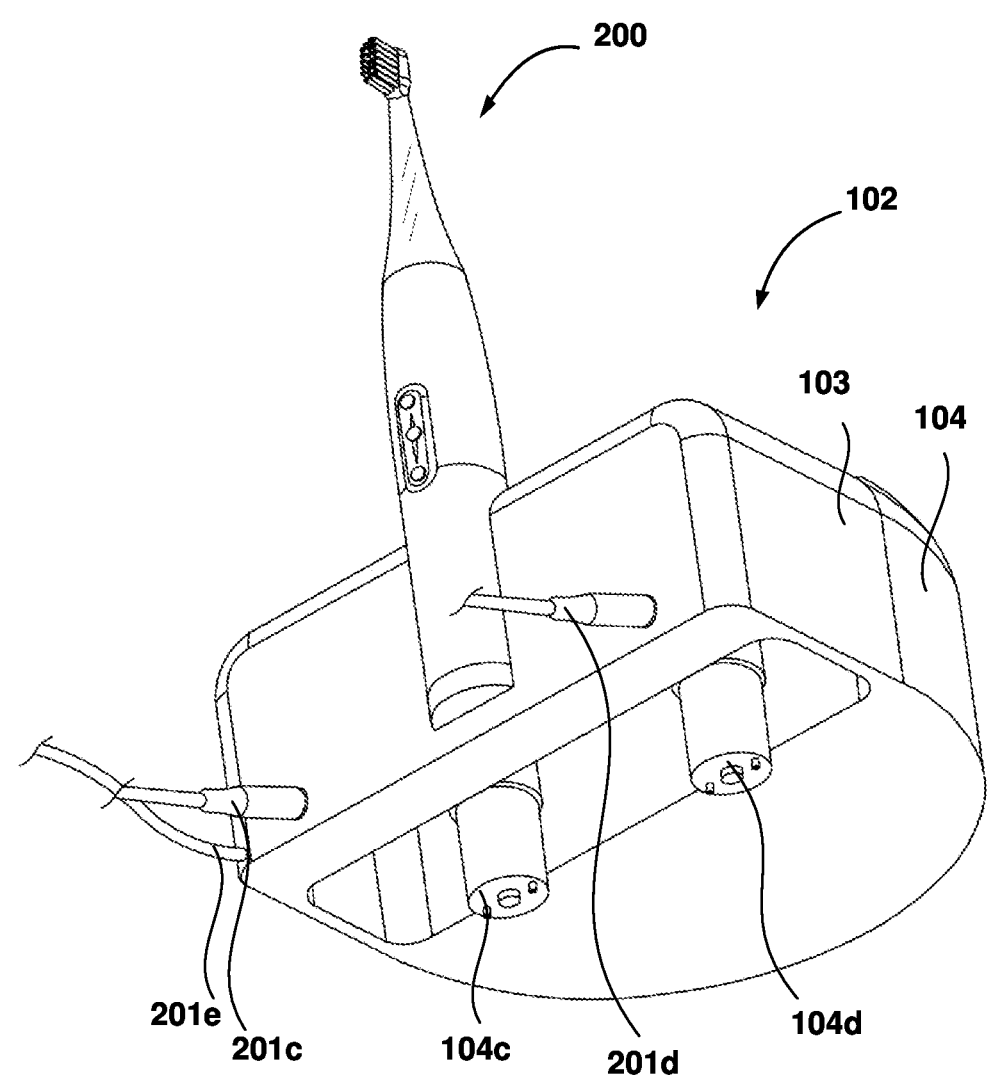
Figure 5:
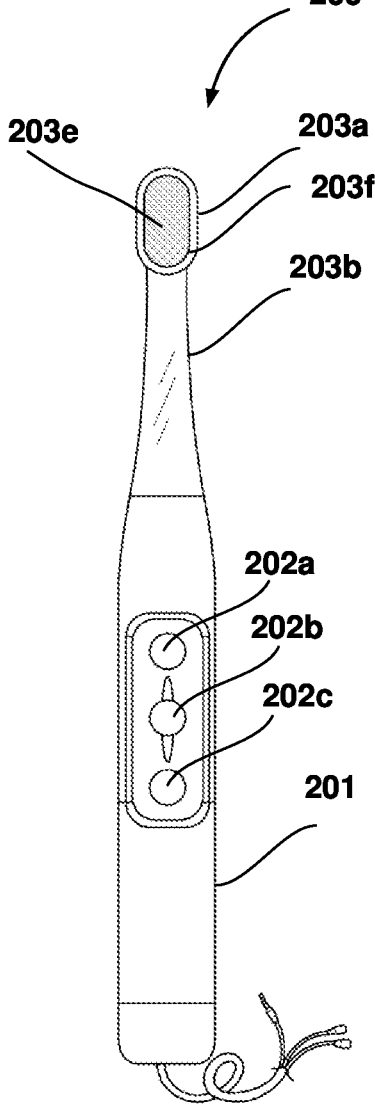
FIGS. 5 and 6 shows a front view and a rear view of the electric toothbrush of FIG. 3.
Figure 6:
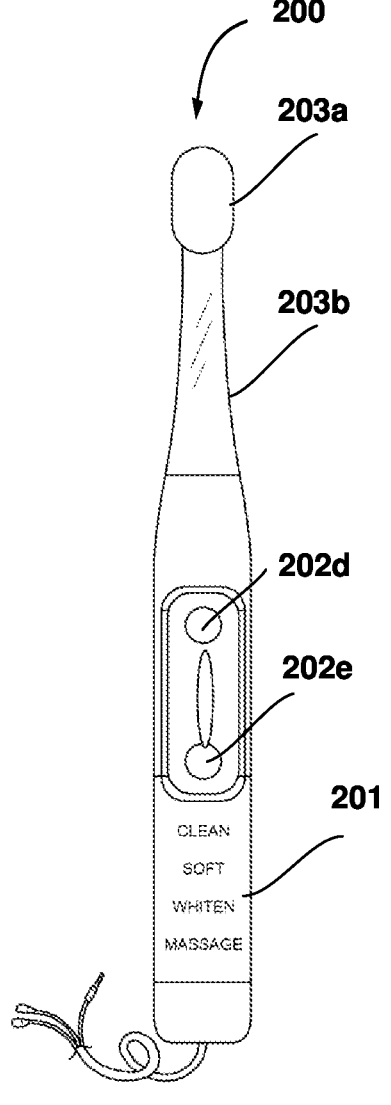

Referring to FIGS. 1 and 2, the base station 102 is configured as a box-like structure and includes a first portion 103, and a second portion 104. Further, as seen in FIGS. 1-2, the second portion 104 of the base station 102 includes a first tank 104a, and a second tank 104b. The tanks 104a, and 104b are removably configured on the base station 102. In some embodiment, the tanks 104a,104b may be permanently fixed on the base station 102. The tank 104a is configured to hold clean water used for rinsing the mouth during brushing. Likewise, the tank 104b is configured for holding oral gunk vacuumed out from the user's mouth after brushing is done. The base station 102 further includes a first diaphragm pump 104c and a second diaphragm pump 104d configured therein. The pump 104c is operationally connected to the tank 104a and the pump 104d is connected to the tank 104b. The pump 104c is responsible for dispensing water out of the first tank 104a into the mouth of the user, and the pump 104d is responsible for vacuuming oral gunk out of the mouth after brushing and collecting it into the tank 104b for disposal.

In an embodiment, the pump 104c is preferably a low-powered diaphragm pump with a 3V-6V rating. The pump 104d is a low-mid powered diaphragm pump with a 9V-12V rating. For example, the pumps 104c and 104d may be a CROCSEE™, Model #CRS-7A016 Volts: DC12V Nom (9-14V), Flow: 0.3 GPM (1.3 LPM) commonly available in the market or any other similar pumps.

Figure 12:
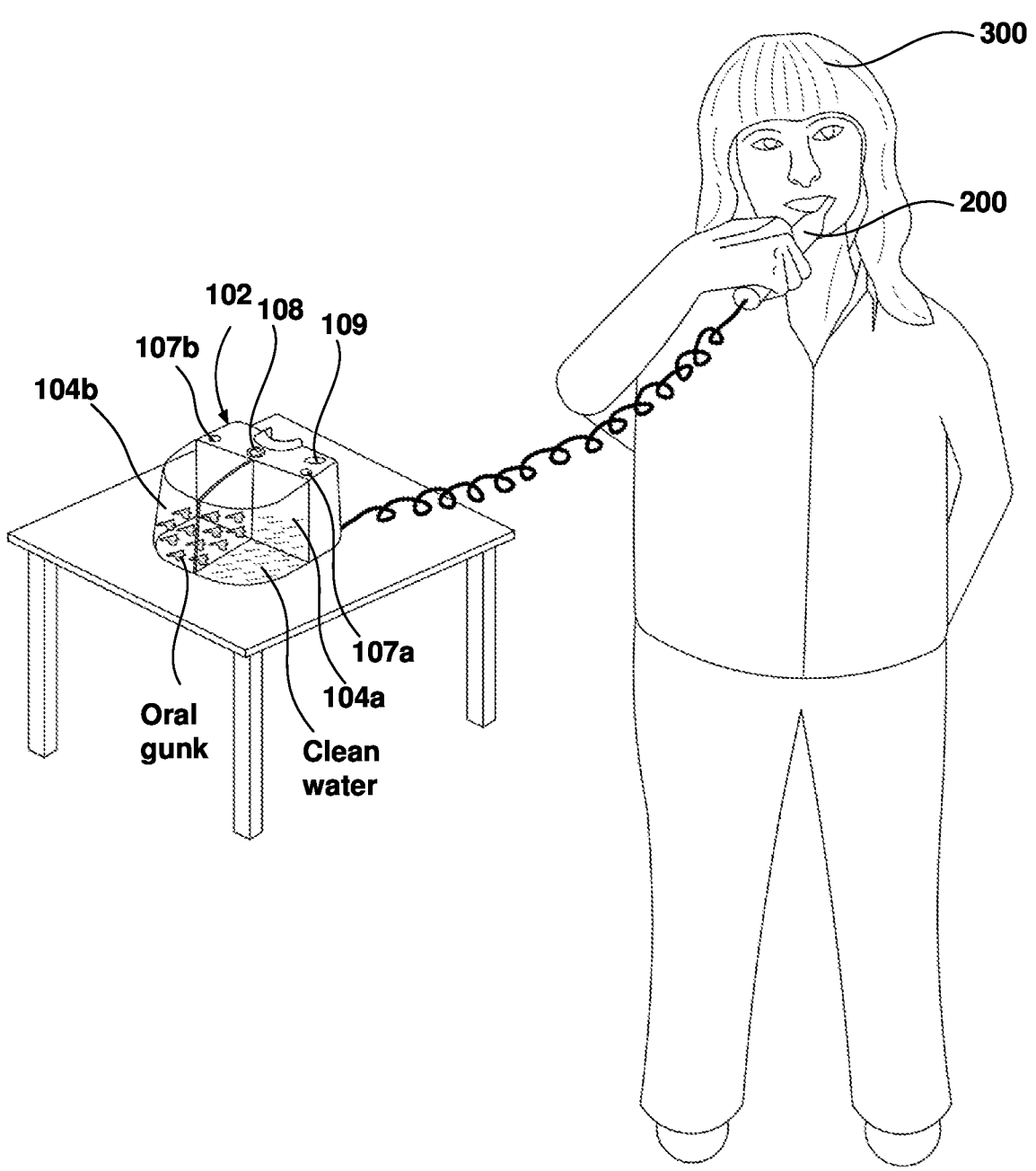
FIG. 12 shows a use-case scenario of the electric toothbrush system of FIG. 1.

Referring to FIGS. 1 and 2 again, the first portion 103 includes a toothbrush mounting provision/slot 103a that removably receives a toothbrush 200. Particularly, the toothbrush mounting provision 103a serves to hold the toothbrush handle 201 of the toothbrush 200 in an upright position as seen in FIG. 1. Additionally, the portion 103 may have a first hose 201c and a second hose 201d connecting the pumps 104c,104d to the toothbrush 200. Also, the base station 102 is provided with a power cable 201e connecting the base station 102 to the mains supply for powering the base station 102. In an example, the cable 201e may be provisioned to connect the portion 103. In an example embodiment, the hoses 201c,201d and/or the power cable 201e may be formed as a single integrated unit in the form of an umbilical cord (as seen in FIG. 12) for ease of use and aesthetics of the product.

According to an embodiment, the first portion 103 of the base station 102 further includes at least a control circuitry with one or more microprocessors, a communication module, memory, and a control logic program stored in the memory for execution by the one or more microprocessors for implementing operations of pumps and other electronic components. The first portion 103 includes a power ON/OFF button 108 to power on or power off the base station 102. Further, a plurality of LED indicators 107a-107c indicative of one or more operations of the toothbrush 200 is configured on the first portion 103. For example, an LED indicator 107a may indicate the status of dispensing water out from the tank 104a. Likewise, an LED indicator 107b may indicate the status of vacuuming out the oral fluids after brushing. Again, an LED 107c may be used to indicate if the toothbrush system 100 is being operated with mains supply or batteries. There may be other additional indicators or less as per design requirements. The microprocessors is configured to control the speed of at least one motor 204a housed in the toothbrush 200 and lighting the plurality of LED indicators 107a-107c for output indications.

In an embodiment, the first portion 103 of the base station 102 further includes a decontaminator unit (not seen) configured to decontaminate the water stored in the first tank 104a using an activation button 109. For example, the decontaminator unit is an ultraviolet-c light source (UV-C light source) capable of killing viruses, bacteria, and fungi present in the water stored in the first tank 104a. UV-C light from UV-C light source when irradiates on viruses, bacteria, and fungi, makes the stored water in the tank 104a clean and uncontaminated and good for rinsing the mouth.

Referring to FIGS. 3-8, 9A-9C, 10-11, the electric toothbrush system 100 further comprises a toothbrush 200. The toothbrush 200 unlike the base station 102 comprises different components. The toothbrush 200 includes a toothbrush handle 201, a head portion 203, and a motion-inducing assembly 204a,204b.

According to an embodiment, the motion-inducing assembly 204a,204b comprises at least one motor 204a mounted on a bracket 204b. The motion-inducing assembly is housed within the toothbrush handle 202. The motor 204a is capable of producing vibrations up to 14000 VPM. Although only one motor 204a is seen, it may be possible to stack up, more than one motor 204a such that spindle 204a' of the motor 204a connects the head 203b of the head portion 203 to impart the vibrational motion and vibrate the head 203b.

The toothbrush handle 201 comprises a proximal end and a distal end and may be made using plastic, ABS, or any other suitable material. The toothbrush handle 201 includes a first fluid conduit 201a, and a second fluid conduit 201b. The conduits 201a,201b are integrally configured on the walls of the toothbrush handle 201. The conduits 201a, and 201b extend partially from the proximal end towards the distal end along the length of the toothbrush handle 201. The fluid conduit 201a is coupled to the tank 104a using the first hose 201c, and the fluid conduit 201b is coupled to the tank 104b using the second hose 201d. The toothbrush handle 201 is ergonomically designed, user-friendly, and offers firm grasping. The toothbrush handle 201 is preferably tubular in shape, however, the handle 201 may be formed in any other shape. The toothbrush handle 201 includes one or more buttons 202a-202e for controlling one or more functionalities of the toothbrush 200. The functionalities of each of the buttons are as under:

a button 202a to turn the toothbrush 200 ON/OFF;

a button 202b to initiate the dispensing of water from the first tank 104a into the mouth of the user (also referred to as "rinse mode");

a button 202c to initiate vacuuming of the oral fluid from the mouth and collection into the second tank 104b (referred to as "vacuum suction mode");

a button 202d to lite up the guide light 203f surrounding the bristles and the LEDs around the neck 203a; and a mode control button 202e to control one or more operating modes of the toothbrush 200 comprising a clean mode, a sensitive mode, a whitening mode, and a massage mode.

According to an embodiment, the one or more operating modes of the toothbrush 200 signify different vibrational speeds of the motor 204a. This mode control button 202e helps in cycling through the 4 modes of vibration in the motor 204a installed in the toothbrush 200 which causes the brushing effect on the teeth and gums of the user. Pressing the button 202e every time, the toothbrush 200 cycle through the 4 modes of vibration—CLEAN, SENSITIVE, WHITEN, and MASSAGE.

Method of Use:

CLEAN mode is set by default or the previous mode that the user may have used). If the user keeps the toothbrush 200 in a particular mode previously, the toothbrush 200 shall restart in the same mode. The button 202e will simply cycle through to the next mode in sequence.

For, assuming the user used it in a CLEAN mode in the last session, then the sequence of operation will be as follows:

POWER ON: CLEAN

Press1: SENSITIVE

Press2: WHITEN

Press3: MASSAGE

Press4: CLEAN . . . (Repeat)

The whitening mode involves turning OFF the conventional LEDs, the guiding LED light, and switching ON a Black Light UV-A light configured in the neck 203b. For example, during the clean mode, the toothbrush 200 head's vibration may range from 10000 to 12000 VPM, during the sensitive mode, the toothbrush 200 head's vibration may range from 7000 to 9000 VPM, during the whitening mode, the toothbrush 200 head's vibration may range from 13000 to 14000 VPM, and during the massage mode, the toothbrush 200 head's vibration may range from 2000 to 5000 VPM.

According to the embodiment, in a rinse mode, when the button 202b is pressed, the pump 104c is activated to dispense small amounts of clean water at low pressure into the mouth to throw a weak stream of water to help the user rinse the mouth. After rinsing of the mouth is done, the button 202b is pressed again to deactivate the process.

Exemplary rinsing specification are as below:

Pressure Range: 10 PSI

Flow Rate/Minute: 1.3 LPM

According to the embodiment, in a vacuum suction mode, when the button 202c is pressed, the pump 104d is activated to for sucking out the collected debris or oral gunk from the mouth of the user. The flow rate/minute should be preferably 0.3 GPM (1.3 LPM). After vacuuming the mouth is done, the button 202c is pressed again to deactivate the process.

Figure 8:
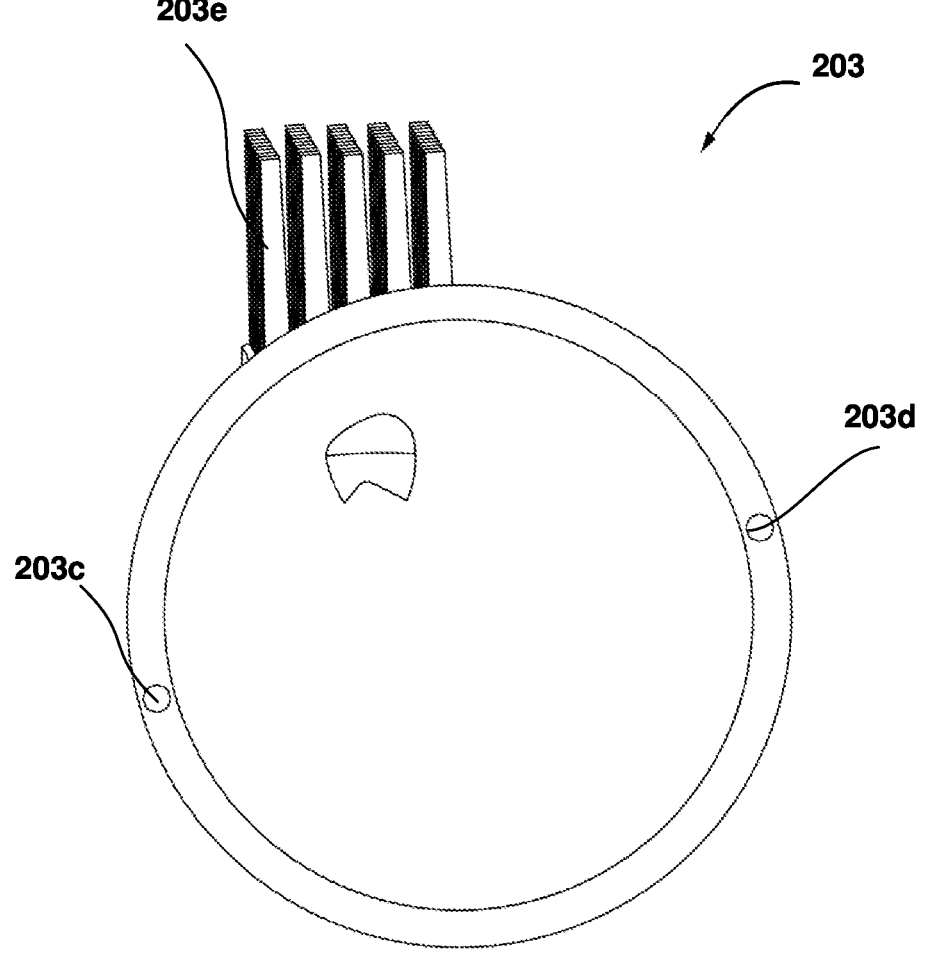
FIG. 8 shows a bottom view of the head portion of FIG. 5.
Figures 9A, 9B, 9C:
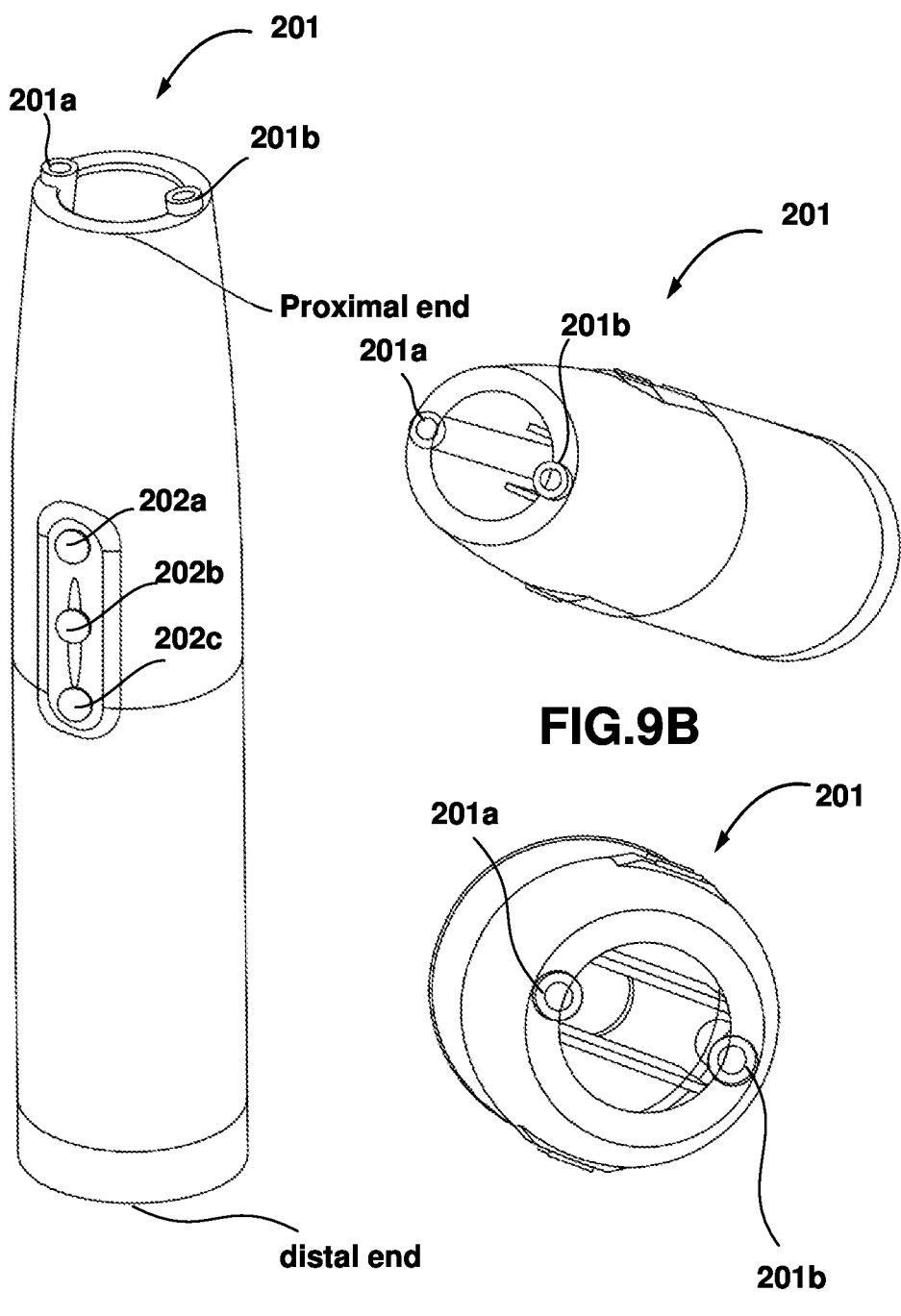
FIGS. 9A-9C shows different perspective views of a toothbrush handle of the electric toothbrush of FIG. 3.
Figures 10, 11:
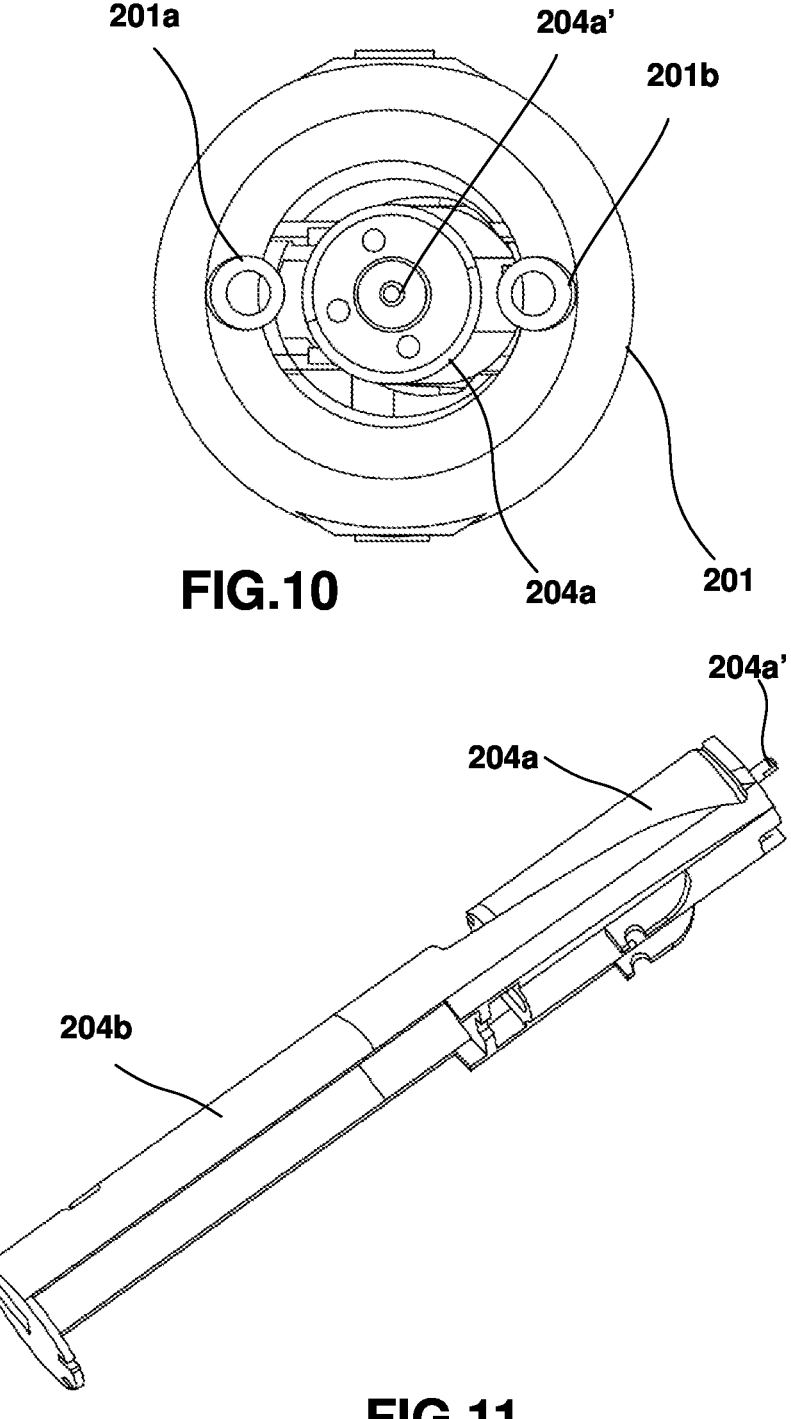
FIG. 10 shows a top view of the toothbrush handle with a motion-inducing assembly housed therein.
FIG. 11 shows a perspective view of the motion-inducing assembly comprising at least one motor and a bracket.

According to the embodiment, the head portion 203 includes a head 203a and a neck 203b. The neck 203b removably couples the head portion 203 to the proximal end of the toothbrush handle 202. Just like the fluid conduits 201a, and 201b of the toothbrush handle 201, the head portion 203 includes a pair of fluid channels 203c, and 203d (FIG. 8). Each of these channels 203c, 203d are axially aligned to the fluid conduit 201a, and the fluid conduit 201b of the toothbrush handle 201 when the head portion 203 is coupled to the toothbrush handle 202. During operation, water dispensed from the first tank 104a to rinse the mouth of the user, passes through the hose 201c to the conduit 201a and through the channel 203c. Likewise, the oral gunk or oral fluid from the mouth of the user (after brushing is done) passes through the channel 203d of the head portion 203, then through the conduit 201b, and then through the hose 201d and is then collected into the second tank 104b.

According to an embodiment, the head 203a incorporates bristles 203e for cleaning the teeth. The bristles 203e are made of nylon or other similar materials known in the art. Additionally, in an embodiment, the head 203a comprises a guiding LED light 203f surrounding the bristles 203e to illuminate the interior region of the mouth. Any suitable LED lights may be used for illuminating the edges of the head 203a surrounding the bristles 203e. In an embodiment, the neck 203b of the head portion 203 or the toothbrush handle 201 may be provided with conventional LEDs to illuminate the neck region. In an embodiment, the neck 203b of the head portion 203 is made transparent in order for the illumination of the neck 203b to pass through the neck 203b to illuminate the interior of the mouth.

Figure 7:
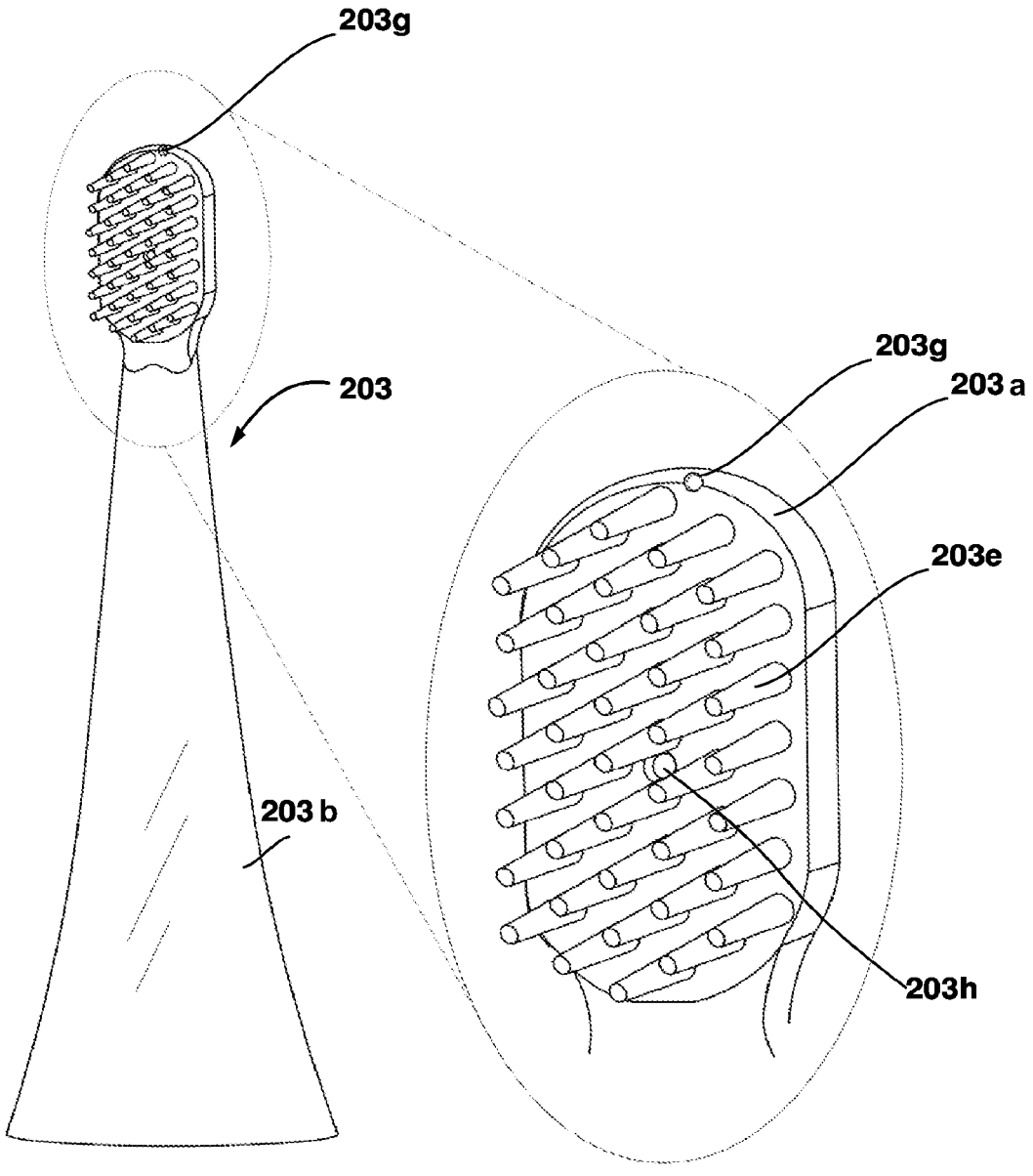
FIG. 7 shows a head portion of the electric toothbrush of FIG. 3 with a head of the head portion shown in a close-up view.

Further, the head 203a of the head portion 203 comprises at least one water dispensing port 203g and at least one oral fluid or oral gunk vacuuming port 203h. For example, the water dispensing port 203g is located on top of the head 203a, and the oral gunk vacuuming port 203h is located on the front of the head 203a where the bristles 203e are located (FIG. 7). Although only one water dispensing port 203g and oral gunk vacuuming port 203h are shown in the accompanying figures, particularly FIG. 7, it should be understood that more than one such ports may be present. The scope of the present invention is not limited to the number of these ports and their specific locations on the head 203e. In assembly, the water dispensing port 203g is configured to get laid in fluid communication with the fluid channel 203c of the head portion 203 and the first fluid conduit 201a of the toothbrush handle 201, and the oral fluid vacuuming port 203h is laid in fluid communication with the fluid channel 203d of the head portion 203 and the second fluid conduit 201b of the toothbrush handle 201. The water dispensing port 203g dispenses the water from the tank 104a all passing through the conduit 201a and the fluid channel 203c. The pump 104c helps in dispensing water through the hose 201c, the conduit 201a, and the fluid channel 203c, and finally out of the port 203g into the mouth for rinsing the mouth before or after brushing. Likewise, the port 203h draws oral gunk out of the mouth of the user after brushing is done which passes through the fluid channel 203d of the head portion 203 and the second fluid conduit 201b of the toothbrush handle 201 and finally through the hose 201d to the tank 104b for disposal.

Further, the toothbrush 200 comprises a control circuitry comprising one or more microprocessors configured to control at least the guiding LED light 203f surrounding the bristles 203e of the head 203a, and the conventional LEDs present in the neck 203b of the head portion 203. The controlling of the guiding LED light 203f and the LEDs present on the neck 203b is done using the button 202d.

Referring to FIG. 12, a use case scenario of the electric toothbrush system 100 of the present invention is shown. The user 300 is seen holding the toothbrush 200 and brushing his/her teeth. The user 300 needs to first ensure that base station 102 and toothbrush 200 are interconnected. The user 300 needs to ensure the first tank 104a of the base station 102 is filled with clean water. The user 300 can optionally activate the UV-C light source to decontaminate the water held in the tank 104a by press of a button. The user then can then power ON the base station 102. Next, the user can power ON the toothbrush 200 using button 202a. The user 300 can then manipulate the button 202e to navigate through the operational modes: CLEAN, SENSITIVE, WHITEN, and MASSAGE for cleaning teeth and gums as desired. In between brushing if the user needs to dispense a small amount of water into the mouth or needs to dispense water into the mouth for rinsing the mouth, then the user just needs to press the button 202b and repress to deactivate dispensing of water. After the brushing is done, when the user needs to throw out the oral fluid/gunk, the user 300 can activate button 202c for sucking out the oral gunk. If needed, the user 300 can press the button 202d to illuminate the interior of the mouth.

The presented electric toothbrush system offers added benefits for kids, aged persons, and patients with disabilities or who are highly dependent on caregivers.

As known by a person skilled in the art, the LEDs on the toothbrush 200 such as those denoting modes of operation may be lit using white LEDs, the toothbrush ON/OFF status may be lit using RED/GREEN LED, the rinse mode button 202b may be illuminated utilizing WHITE LED, the vacuum suction button 202c may be illuminated utilizing WHITE LED, UV-C light indicator may be illuminated using BLUE light and so on. The electronic toothbrush and associated components of the invention may be made using a variety of materials and in a variety of dimensions, and thus the scope of the present invention should not be considered limited to the materials, and dimensions discussed herein above.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. An electric toothbrush system (100), comprising:

(a) a base station (102) including a first portion (103) with a toothbrush mounting provision (103 a); and a second portion (104), said second portion including a first tank (104 a) with a first diaphragm pump (104 c) operationally connected thereto for dispensing water from the first tank (104 a) into a mouth of a user, and a second tank (104 b) with a second diaphragm pump (104 *d*) operationally connected thereto for vacuuming oral fluid after brushing and collecting into the second tank (104 *b*);

(b) a toothbrush (200) including a toothbrush handle (201) having a proximal end and a distal end, the toothbrush handle (201) comprising a first fluid conduit (201 *a*), and a second fluid conduit (201 *b*) extending partially from the proximal end towards the distal end along the length of the toothbrush handle (201), wherein the first fluid conduit (201 *a*) is coupled to the first tank (104 *a*) using a first hose (201 *c*), and the second fluid conduit (201 *b*) is coupled to the second tank (104 *b*) using a second hose (201 *d*);

one or more buttons (202 *a*-202 *e*) for controlling one or more functionalities of the toothbrush (200);

a head portion (203) comprising a head (203 *a*) and a neck (203 *b*), the neck (203 *b*) is configured to removably couple the head portion (203) to the proximal end of the toothbrush handle (201), wherein the head portion (203) comprises a pair of fluid channels (203 *c*,203 *d*) each axially aligned to the first fluid conduit (201 *a*), and the second fluid conduit (201 *b*) of the toothbrush handle (201) when the head portion (203) is coupled to the toothbrush handle (201); and a motion-inducing assembly (204 *a*,204 *b*) comprising at least one motor (204 *a*) mounted on a bracket (204 *b*), the motion-inducing assembly (204 *a*,204 *b*) is housed within the toothbrush handle (201), whereby the first portion (103) of the base station (102) further includes at least:

a first control circuitry comprising one or more microprocessors;

a power ON/OFF button (108);

a plurality of LED indicators (107 *a*-107 *c*) indicative of one or more operations of the toothbrush (200), and if the toothbrush is being operated with mains supply or batteries; and a decontaminator unit configured to decontaminate the water stored in the first tank (104 *a*) using an activation button (109).

2. The electric toothbrush system (100) of claim 1, wherein the operations of the toothbrush (200) comprises at least dispensing of water into the mouth, and vacuuming out the oral fluids after brushing.

3. The electric toothbrush system (100) of claim 1, wherein the one or more microprocessors is configured to control the speed of the at least one motor (204 *a*) and lighting the plurality of LED indicators (107 *a*-107 *c*) for output indications.

4. The electric toothbrush system (100) of claim 1, wherein the decontaminator unit is an ultraviolet-c light source (UV-C light source) capable of killing viruses, bacteria, and fungi present in the water in the first tank (104 *a*) by irradiating said viruses, bacteria, and fungi with UV-C light.

5. The electric toothbrush system (100) of claim 1, wherein each of the first fluid conduit (201 *a*), and the second fluid conduit (201 *b*) of the toothbrush handle (201) are integrally formed on a wall of the toothbrush handle (201).

6. The electric toothbrush system (100) of claim 1, wherein the first diaphragm pump (104 *c*) is a diaphragm pump with a 3V-6V rating.

7. The electric toothbrush system (100) of claim 1, wherein the second diaphragm pump (104 *d*) is a diaphragm pump with a 9V-12V rating.

8. The electric toothbrush system (100) of claim 1, wherein the base station (102) is powered by a mains supply or using one or more batteries.

9. The electric toothbrush system (100) of claim 1, wherein the head (203 *a*) comprises bristles for cleaning the mouth, and a guiding LED light surrounding the bristles to illuminate an interior region of the mouth.

10. The electric toothbrush system (100) of claim 1, wherein the neck (203 *b*) of the head portion (203) is transparent.

11. The electric toothbrush system (100) of claim 1, wherein the neck (203 *b*) of the head portion (203) or the toothbrush handle (201) comprises LEDs to illuminate an interior region of the mouth.

12. The electric toothbrush system (100) of claim 1, wherein the at least one motor (204 *a*) is capable of producing vibrations up to 14000 VPM.

13. The electric toothbrush system (100) of claim 1, wherein the head (203 *a*) comprises at least one water dispensing port in fluid communication with the fluid channel (203 *c*) of the head portion (203) and the first fluid conduit (201 *a*) of the toothbrush handle (201).

14. The electric toothbrush system (100) of claim 1, wherein the head (203 *a*) comprises at least one oral fluid vacuuming port in fluid communication with the fluid channel (203 *d*) of the head portion (203) and the second fluid conduit (201 *b*) of the toothbrush handle (201).

15. The electric toothbrush system (100) of claim 1, wherein the one or more buttons (202 *a*-202 *e*) for controlling one or more functionalities of the toothbrush (200) includes at least:

a first button (202 *a*) to turn the toothbrush (200) ON/OFF;

a second button (202 *b*) to initiate the dispensing of water from the first tank (104 *a*) into the mouth of the user;

a third button (202 *c*) to initiate vacuuming of the oral fluid from the mouth and collection into the second tank (104 *b*); and a fourth button (202 *d*) to light up a guide light (2031) surrounding a plurality of bristles (203 *e*) and a plurality of LEDs around the neck (203 *a*);

a mode control button (202 *e*) to control one or more operating modes of the toothbrush (200) comprising a clean mode, a sensitive mode, a whitening mode, and a massage mode.

16. The electric toothbrush system (100) of claim 15, wherein the one or more operating modes of the toothbrush (200) identifies different vibrational speeds of the at least one motor (204 *a*).

17. The electric toothbrush system (100) of claim 15, wherein the whitening mode involves turning OFF the plurality of LEDs, a guiding LED light, and switching ON a Black Light UV-A light configured in the neck (203 *b*).

18. The electric toothbrush system (100) of claim 15, wherein the toothbrush (200) further comprises a second control circuitry comprising one or more microprocessors configured to control at least a guiding LED light surrounding the plurality of bristles of the head (203 *a*), and the plurality of LEDs present in the neck (203 *b*) of the head portion (203) or the toothbrush handle (201).

19. The electric toothbrush system (100) of claim 15, wherein during the clean mode the toothbrush (200) head's vibration ranges from 10000 to 12000 VPM, during the sensitive mode the toothbrush (200) head's vibration ranges from 7000 to 9000 VPM, during the whitening mode the toothbrush (200) head's vibration ranges from 13000 to 14000 VPM, and during the massage mode the toothbrush (200) head's vibration ranges from 2000 to 5000 VPM.

20. An electric toothbrush system (100), comprising:

(a) a base station (102) including:

a first portion (103) with a toothbrush mounting provision (103 a); and a second portion (104), said second portion including a first tank (104 a) with a first diaphragm pump (104 c) operationally connected thereto for dispensing water from the first tank (104 a) into a mouth of a user, and a second tank (104 b) with a second diaphragm pump (104 d) operationally connected thereto for vacuuming oral fluid after brushing and collecting into the second tank (104 b);

(b) a toothbrush (200) including:

a toothbrush handle (201) having a proximal end and a distal end, the toothbrush handle (201) comprising a first fluid conduit (201 a), and a second fluid conduit (201 b) extending partially from the proximal end towards the distal end along the length of the toothbrush handle (201), wherein the first fluid conduit (201 a) is coupled to the first tank (104 a) using a first hose (201 c), and the second fluid conduit (201 b) is coupled to the second tank (104 b) using a second hose (201 c);

a head portion (203) comprising a head (203 a) and a neck (203 b), the neck (203 b) is configured to removably couple the head portion (203) to the proximal end of the toothbrush handle (201), wherein the head portion (203) comprises a pair of fluid channels (203 c,203 d) each axially aligned to the first fluid conduit (201 a), and the second fluid conduit (201 b) of the toothbrush handle (201) when the head portion (203) is coupled to the toothbrush handle (201);

a motion-inducing assembly (204 a,204 b) comprising at least one motor (204 a) mounted on a bracket (204 b), the motion-inducing assembly (204 a,204 b) is housed within the toothbrush handle (202); and one or more buttons (202 a-202 e) for controlling one or more functionalities of the toothbrush (200), wherein the one or more buttons (202 a-202 e) for controlling one or more functionalities of the toothbrush (200) includes at least: (i) a first button (202 a) to turn the toothbrush (200) ON/OFF; (ii) a second button (202 b) to initiate the dispensing of water from the first tank (104 a) into the mouth of the user; (iii) a third button (202 c) to initiate vacuuming of the oral fluid from the mouth and collection into the second tank (104 b); and (iv) a fourth button (202 d) to light up a guide light (2031) surrounding a plurality of bristles (203 e) and a plurality of LEDs around the neck (203 a); and (v) a mode control button (202 e) to control one or more operating modes of the toothbrush (200) comprising a clean mode, a sensitive mode, a whitening mode, and a massage mode, wherein the one or more operating modes of the toothbrush (200) identifies different vibrational speeds of the at least one motor (204 a), and wherein the whitening mode involves turning OFF the plurality of LEDs, a guiding LED light, and switching ON a Black Light UV-A light configured in the neck (203 b).

* * * * *